（12）United States Patent
Barowski et al.

(10) Patent No.: US 8,989,532 B2
(45) Date of Patent: Mar. 24, 2015

(54) INTEGRATED CIRCUIT PACKAGE CONNECTED TO AN OPTICAL DATA TRANSMISSION MEDIUM USING A COOLANT

(75) Inventors: Harry Barowski, Boeblingen (DE); Thomas Brunschwiler, Rueschlikon (CH); Roger F. Dangel, Rueschlikon (CH); Hubert Harrer, Boeblingen (DE); Andreas Huber, Boeblingen (DE); Norbert M. Meier, Rueschlikon (CH); Bruno Michel, Rueschlikon (CH); Tim Niggemeier, Boeblingen (DE); Stephan Paredes, Rueschlikon (CH); Jochen Supper, Boeblingen (DE); Jonas R. Weiss, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 13/312,583

(22) Filed: Dec. 6, 2011

(65) Prior Publication Data

US 2012/0147559 A1  Jun. 14, 2012

(30) Foreign Application Priority Data

Dec. 9, 2010  (EP) .................................... 10194319

(51) Int. Cl.
*G02B 6/12* (2006.01)
*G02B 6/43* (2006.01)
*G02B 6/122* (2006.01)

(52) U.S. Cl.
CPC ............. *G02B 6/43* (2013.01); *G02B 6/12002* (2013.01); *G02B 6/122* (2013.01)

USPC ............................................. 385/14; 385/125

(58) Field of Classification Search
None
See application file for complete search history.

(56) References Cited

U.S. PATENT DOCUMENTS

| 5,394,490 | A |  | 2/1995 | Kato et al. |
|---|---|---|---|---|
| 5,761,350 | A | * | 6/1998 | Koh ................................ 385/14 |
| 2004/0061845 | A1 | * | 4/2004 | Dirac ............................... 356/36 |
| 2004/0240832 | A1 | * | 12/2004 | Hoke ............................. 385/143 |
| 2005/0220429 | A1 | * | 10/2005 | Davis ............................. 385/123 |
| 2007/0031097 | A1 | * | 2/2007 | Heikenfeld et al. ........... 385/129 |
| 2009/0097808 | A1 | * | 4/2009 | Wolfe et al. ................... 385/125 |

OTHER PUBLICATIONS

Patrick Dumais et al., "Liquid Core Modal Interferometer Integrated with Silica Waveguides," IEEE Photonics Technology Letters, vol. 18, No. 6, pp. 746-748, Mar. 2006.
Dennis W. Prather et al.,"Optoelectronic Multichip Module Integration for Chip Level Optical Interconnects," IEEE Photonics Technology Letters; vol. 13, No. 10, pp. 1112-1114, Oct. 2001.
Dmitri V. Vezenov et al., "Fluid Optical Waveguides for on-Chip Manipulation and Generation of Light," IEEE Conference Proceedings, LEOS Summer Topical Meetings, 2006.

* cited by examiner

*Primary Examiner* — Tina Wong
(74) *Attorney, Agent, or Firm* — Cantor Colburn LLP

(57) ABSTRACT

An integrated circuit coupling device includes an integrated circuit package; and an optical data transmission medium connected to the integrated circuit package, and comprising a movable coolant, adapted to remove heat from the integrated circuit package, in operation.

16 Claims, 1 Drawing Sheet

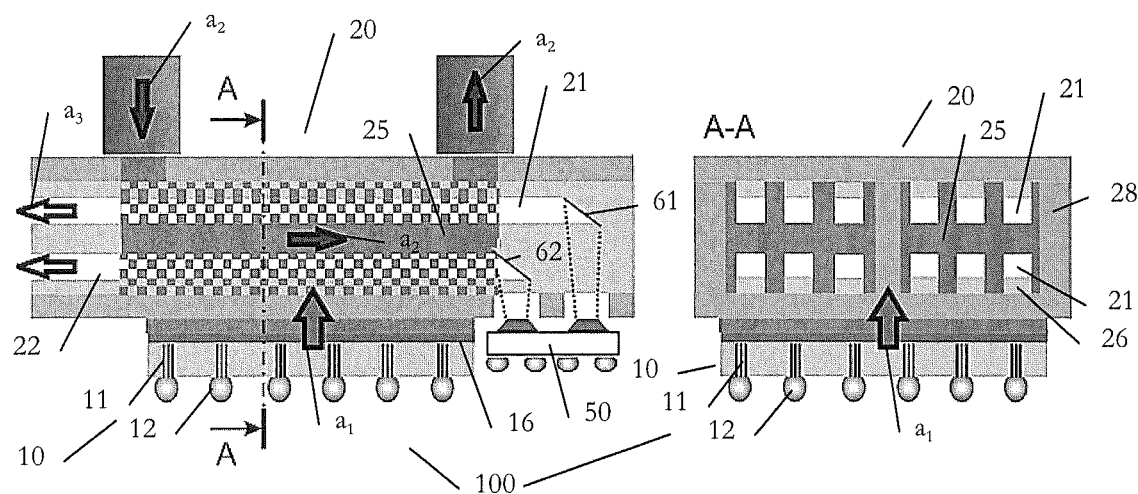
FIG. 1A                    FIG. 1B
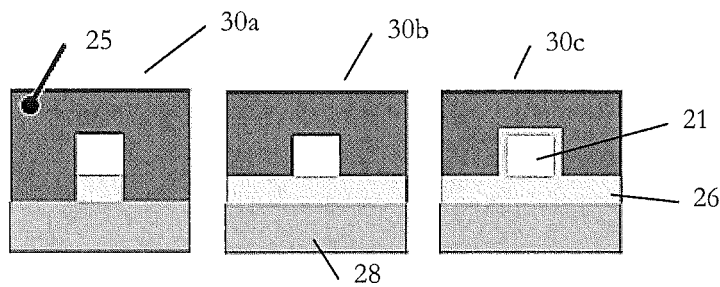
FIG. 2A    FIG. 2B    FIG. 2C
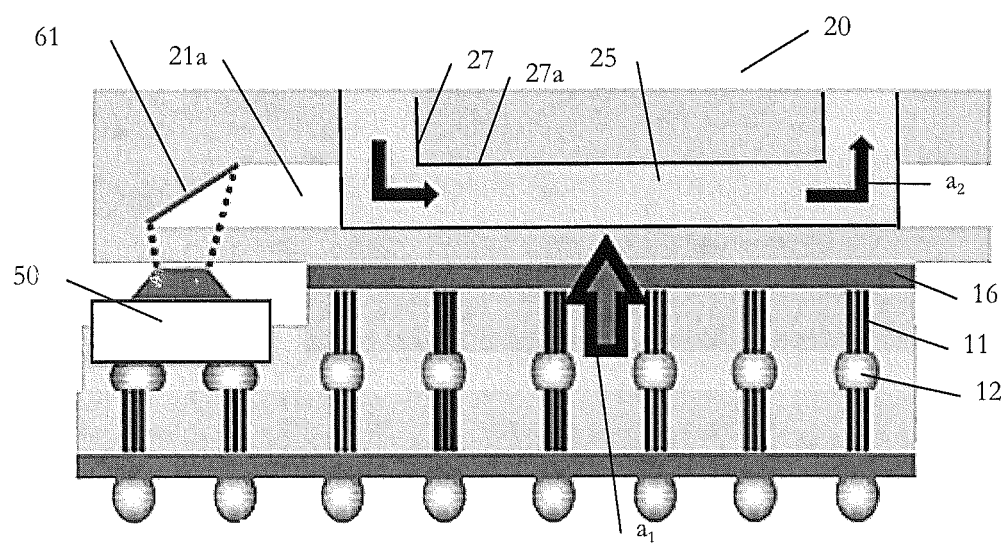
FIG. 3

INTEGRATED CIRCUIT PACKAGE CONNECTED TO AN OPTICAL DATA TRANSMISSION MEDIUM USING A COOLANT

PRIORITY

This application claims priority to European Patent Application No. 10194319.9, filed 9 Dec. 2010, and all the benefits accruing therefrom under 35 U.S.C. §119, the contents of which in its entirety are herein incorporated by reference.

BACKGROUND

The disclosure relates generally to integrated circuits (ICs), and more particularly to the field of connection of data transmission medium to integrated circuit packages and convective heat removal.

On today's printed circuit boards, information and electrical power is typically transferred over copper wires between CPUs, memory and I/O devices. Interconnect technologies such as pins, ball bonding and solder bumps connect the wires with the devices. While fiber optic links have so far dominated network and data communications for long distances, copper still generally prevails as the interconnect of choice at shorter distances, for reasons of cost, reliability, availability, and ease of manufacturability.

However, optical links receive more and more attention as copper interconnects are reaching their physical limits in terms of data rate requirements and density, at least in some applications. Thus, optical interconnects are today regarded as one solution to mitigate the communication bandwidth bottleneck as expected in future computing applications. Yet, the extension of optical interconnects to chip-scale systems has received limited attention only, due to difficulties in reliably integrating optoelectronic systems on this scale. Some solutions are proposed in the literature, see e.g., Prather et al., IEEE Photon. Technol. Lett., vol. 13, pp. 1112-1114, October 2001.

Typical solutions proposed in the literature consist, for example, of providing a chip stack with heat removal from one side through some convenient thermal interface and an optical back plane on the opposite side of the chip stack. Such a configuration has a number of drawbacks. Notably, electrical Input/Output (I/O) and power delivery have to share a chip face area with optical I/O, which constrains the power delivery. This further assumes integrating optical and electrical technologies into a same board, which results in processing constraints and routing congestions. Furthermore, the temperature sensible optical element (in this case a laser), is placed in close vicinity of a CMOS chip, which is typically operated at high temperatures.

The following documents discuss aspects of the background art. Useful technical details may be found therein:

"Fluid optical waveguides for on-chip manipulation and generation of light", Vezenov, D. V., Mayers, B. M., Tang, S. K. Y., Conroy, R. S., Wolfe, D. B., Whitesides, G. M., IEEE Conference Proceedings, LEOS Summer Topical Meetings, 2006, Digest. This paper discusses applications of liquid-core liquid-cladding waveguides in several dynamic photonic systems. These optical components could be reconfigured in terms of their geometry, refractive index, or chemical composition.

"Liquid core modal interferometer integrated with silica waveguides", Dumais, P. Callender C. L., Noad C. J., Ledderhof C. J., IEEE photonics technology letters, 2006, vol. 18, no 5-8, pp. 746-748, wherein an integrated structure is demonstrated as a refractive index sensor. The structure consists of a liquid-filled elliptical microchannel embedded in silica glass and integrated with waveguides.

U.S. Pat. No. 5,394,490, wherein a clock signal supply system is disclosed for a semiconductor device with a semiconductor chip and a wiring substrate connected in flip-chip fashion and an optical waveguide interposed in the space between electrode members, in which the mutual arrangement of the electrical interconnection and the optical waveguide interconnection on the wiring substrate is not affected and can be used separately from each other for different applications, thereby improving the throughput of the interconnections as a whole.

U.S. Pat. No. 5,761,350, wherein improved Micro Opto-ElectroMechanical Systems (MOEMS) are provided to support the seamless integration of high performance computer systems and communication networks. Such MOEMS integrate high speed electronic processing units and high bandwidth photonic interconnection networks by combining them into a single module: (1) active electronic/photonic processing units, (2) passive electronic/photonic interconnection networks, and (3) micromachined silicon mirrors used as optical Input/Output (I/O) couplers.

BRIEF SUMMARY

According to a first aspect thereof, an integrated circuit coupling device includes an integrated circuit package; and an optical data transmission medium connected to the integrated circuit package, and comprising a movable coolant, adapted to remove heat from the integrated circuit package, in operation.

Methods and devices embodying the present disclosure will now be described, by way of non-limiting examples, and in reference to the accompanying drawings.

BRIEF DESCRIPTION OF SEVERAL VIEWS OF THE DRAWINGS

FIG. 1A schematically illustrates a sectional view of an IC coupling device with an IC package and an optical data transmission medium having a coolant acting partially as a waveguide cladding, according to embodiments of the disclosure;

FIG. 1B depicts a transverse section of the same device, along the AA direction as indicated in FIG. 1A;

FIGS. 2A, 2B and 2C illustrates possible variants of cladding vs. core material configurations for the optical data transmission medium, as involved in embodiments; and FIG. 3 illustrates an IC coupling device, wherein the optical data transmission medium is equipped with a coolant acting as a core optical material, according to embodiments of the disclosure.

DETAILED DESCRIPTION

Disclosed herein is an integrated circuit (IC) coupling device. The device includes an IC package connected to an optical data transmission medium, e.g., an optical plane. Interestingly, the latter is equipped with a coolant, to remove heat from the IC package, in operation. Thus, the optical medium not only serves to convey information to the IC package but also to remove heat from electronic components. The optical device is likely connected on one side of the IC package. Such a functional combination (cooling and optics) notably allows for a reliable and affordable separated electrical and optical chip stack access.

Incidentally, such a solution can be applied to various types of IC packages, including 2D and 3D solutions, the latter ranging from mere 3D packagings (with off-chip signaling only) to 3D ICs (with additional vertical, in-stack signaling). Thus, unless otherwise specified, the term "IC package" is hereafter intended to cover various 2D to 3D packagings.

In more detail, in reference to FIGS. 1-3 collectively, IC coupling devices 100 are schematically represented, which first include an IC package 10 with one or more IC layers. Such IC packages may include through silicon vias (TSVs) 11, solder balls 12, provided on each IC layer, amongst other usual features. Numeral reference 16 denotes (symbolically) the back-end-of line (BEOL) interconnect structure. Obviously, some details are omitted, for clarity. The package may for instance be arranged as a processor+memory 3D stack, with the cache memory stacked on top of the processor.

Second, the device 100 further includes an optical data transmission (or DT) medium 20, connected to the IC package, typically on one side thereof (e.g., on top), as depicted in the figures. Other connection configurations, e.g., from a lateral side, may yet be contemplated.

Importantly, the optical DT medium is provided with a coolant 25, e.g., a fluid with suitable thermo-physical and optical properties, which can be circulated in the DT medium, as represented by arrows $a_2$. The circulation of the coolant is not necessarily performed in closed circuit. More generally, the coolant consists of some fluid moving inside suitable channels or unfilled space provided within the DT medium. The resulting device 100 can conveniently remove heat from the IC package, in operation, as symbolically represented by the arrow $a_1$.

As will be described in more detail below, the coolant can, for instance, be part of a cladding material (as in FIGS. 1-2) or a core material (FIG. 3) of the optical DT medium. A coolant with acceptable optical properties is used. Finally, the flow rate is chosen according to the thermophysical properties of the coolant. Still other configurations may be contemplated, wherein the coolant is circulated into additional unfilled space provided within the DT medium, while not specifically acting as a core or cladding material (e.g., in peripheral cavities). Such variants are, however, not preferred, inasmuch as additional unfilled space or polymer is required in the DT medium, see e.g., FIG. 2C.

The coupling device 10 may further comprise a power delivery device such as an electrical plane (not shown), electrically connected to the IC package (e.g., on an opposite side) but distinct from the optical DT medium. This is advantageous in several respects. Notably, electrical I/O and power delivery do not have to share chip face area with optical I/O. In terms of processing constraints, solutions as provided in the present disclosure do not require integrating optical and electrical technologies into a same board.

Also, the device 100 may further include a heat transfer device such as a cold plate (not shown), in thermal communication with both the IC package and the optical DT medium. Note that the DT medium may suffice to suitably remove all the heat produced buy electronic components, such that no heat-sink infrastructure is required beyond an intermediate heat transfer device. Still, embodiments can be contemplated wherein the DT medium heat removal capacity is supplemented with an auxiliary heat-sink infrastructure.

Referring more specifically to FIGS. 1-2, the coolant 25 can, for instance, be configured to serve as a partial cladding material for the DT medium. In that case, the refractive index of the coolant is less than the refractive index of the core 21.

The cladding material may further include additional material other than the coolant. For example, the cladding material may further include a polymer 26 in contact with the core material. This additional polymer 26 also serves as cladding, while allowing for fixing the core to a surrounding structure 28, e.g., copper, which itself allows for transferring heat.

FIGS. 2A-C illustrates three variants of core vs. cladding configurations 30a-c. FIG. 2A corresponds to the case already depicted in FIGS. 1A-B, where the polymer layer width matches that of the core 21. In that case, the surrounding structure 28 is maximally exposed to the coolant, wherein better heat transfer can be achieved. In FIG. 2B, heat transfers partly through the polymer, which might be less efficient. Yet, the design of FIG. 2B is easier to manufacture. FIG. 2C provides still another variant, wherein the polymer encloses the core material completely. In that case, the coolant is provided distinct from the core and the polymer cladding, within the DT medium. In case sufficient polymer cladding is provided, the coolant may not be required to specifically serve as a core or cladding material. Thus, in embodiments, the coolant is not required to have a specific optical property. In addition, configurations such as that of FIG. 2C allow for protecting the core material against liquid absorption from the coolant. This gives rise to many more coolants/core materials combinations, with possibly improved thermo-physical and/or optical properties.

More generally, what results from FIGS. 2A-C is that a polymer may be in contact with or enclose part or all the core material, while the coolant directly contacts a remaining (i.e., not enclosed) surface portion of the core.

Referring back to FIGS. 1A-B, the integrated IC coupling device 100 may further comprise additional devices for suitably guiding/converting optical signals. For instance, it may include mirrors 61, 62 for redirecting optical signals to or from the core sections 21, as denoted by arrows $a_3$. It may further include electro-optical and/or opto-electrical conversion circuits that couple to the core material via the mirrors, e.g., vertical-cavity surface-emitting lasers (VCSELs) 50 and photo-diodes.

Turning to FIG. 3, here the coolant serves as a core material. The refractive index of the coolant is now larger than that of the surrounding cladding material. To achieve this, a coolant fluid circuit 27 may be provided in the optical DT medium 20, to receive the coolant 25. In the example of FIG. 3, a section 27a of this circuit is on the same optical path as defined by additional core material 21a (there, the index of the coolant preferably matches that of the additional core material). Such a configuration generally allows for directing an optical signal from the IC package to the coolant. Other configurations can yet be contemplated, involving more or less additional core material 21a.

Again, the integrated IC coupling device 100 may further include one or more mirrors 61 for redirecting optical signals to or from the additional core material 21a. Signals are further converted between the electrical and optical domains by way of any suitable intermediate element 50, such as photodetectors and VCSELs.

Referring to FIGS. 1-3 altogether, the minimal refractive index contrast sought between the cladding and core materials of the optical medium 20 is preferably larger than 0.01 and typically between 0.01 and 0.02 for some multimode applications, in order to enable confinement of the optical energy. Yet, for single-mode and on-chip single-mode applications, the refractive index contrast may vary substantially from an application to another (e.g., from 0.1's to 10's of percents).

Typically, a satisfactory mass transfer with according heat exchange can be achieved when a characteristic dimension of a transverse section of a channel or cavity receiving the coolant is between 50 and 200 micrometers. Correspondingly, tests have shown that characteristic dimensions for the core transverse section between 20 and 100 micrometers are most favorable in practice.

Suitable coolant liquids and polymer materials are provided in the following table (Table I), together with corresponding refractive indices (or ranges thereof, at the specified wavelength), when known.

TABLE I

Coolant and polymer material candidates

| Fluid | Refractive Index (at 589 nm) | Polymer | Refractive Index |
|---|---|---|---|
| Water | 1.333 | PDMS (polydimethylsiloxane) | 1.41-1.43 (at 589 nm) |
| PEG (Polyethylene glycol) | 1.459 | UV curable optical adhesives (e.g., from NORLAND Products) | 1.52, 1.54, 1.56 (at 633 nm) |
| Water - PEG | 1.33 to 1.459 | Silsesquioxane (e.g., from DOW CHEMICAL) | 1.48, 1.49, 1.51 (at 633 nm) |
| EG (Ethylene glycol): | 1.44 | Siloxane (e.g., from DOW CORNING) | |
| Water EG mixture | 1.33 to 1.44 | PMMA (polymethylmethacrylate) | 1.49 (at 589 nm) |
| FC-70 fluorocarbon | 1.30 | Ormocer-based polymers (e.g., from Micro Resist Technology) | 1.53-1.55 (at 633 nm) |
| Haloalkane refrigerant, e.g., R-134a | 1.21 | Epoxide-based polymers (e.g., from Micro Resist Technology) | 1.57-1.58 (at 830 nm) |
| Isopropanol | 1.377 | Perfluorinated acrylates (e.g., from ChemOptics) | 1.375-1.395 1.43-1.46 1.45-1.48 (at 1550 nm) |
| Dynalene | 1.37 | | |
| Ethanol | 1.36 | | |
| Coolanol | 1.41 | | |
| R-11 Freon | 1.37 | | |
| Dichlorodifluoromethane, R-12 | 1.29 | | |
| Chlorodifluoromethane or HCFC-22, R-22. | 1.26 | | |

Note that mixtures of fluids can be contemplated, as exemplified in Table I.

To implement embodiments such as in FIGS. 1-2, a coolant (e.g., water) with a lower refractive index than the polymer (e.g., UV curable epoxy adhesive) may be selected, and preferably with a 0.01 contrast or more. Additional (cladding) polymer can be selected, with again a minimal 0.01 index contrast (e.g., silsesquioxane).

To implement embodiments such as in FIG. 3, a coolant (e.g., polyethylene glycol) with a higher refractive index than the (cladding) polymer (e.g., polydimethylsiloxane) may be selected. Additional (core) polymer material can be selected which has a refractive index matching that of the coolant (e.g. perfluorinated acrylates).

A brief description regarding the manufacture of a coupling device as set forth herein is now provided, and more particularly with respect to the manufacture of the DT medium. Although polymers of different classes (e.g., acrylates, epoxies, silicones) may differ in their processing details, they typically have the following main process steps in common:

(1) Deposition and polymerization, e.g., radiation-induced (e.g. UV, thermal) of cladding with refractive index n2, e.g., on copper. For instance, the variant of FIG. 2A (structured cladding) is typically achieved with UVs, while in FIG. 2B, a full area UV-curing or temperature induced polymerization is used;

(2) Deposition of photo-sensitive core layer with n1>n2;

(3) Waveguide patterning by UV photolithography or UV laser direct writing;

(4) Subsequent wet-chemical development, and (5) Deposition and UV-induced polymerization of photosensitive upper cladding (n2), if needed.

Concerning now other (minor) aspects, note that instead of mirrors, other methods could be used for coupling the electrooptical element to the waveguides, such as the so-called buttcoupling method, which is simple to implement and does not require any extra components. However, other coupling schemes, such as using lenses, mirrors, gratings, and other optical elements can also be contemplated.

If necessary, suitable intermediate driver/receiver chips can be provided, to be connected to the IC chip. More generally, the DT medium can be connected to the IC package via such driver and/or receiver circuits, or any intermediate structure (e.g., any suitable interposer).

For simplicity, electrical connections between a VCSEL or photodetector and the IC package may occur via the back-end-of-the-line (BEOL) interconnect structure 16 of the chips or through TSVs (11). For example, they are connected through solder balls, as depicted in the figures.

As will be appreciated, the present disclosure can advantageously be applied to IC coupling devices equipped with IC chips, as described herein, as well as processors and computers (e.g., datacenter) equipped with such IC coupling devices. A computer using such devices may require slightly modified computer program code to run such devices, notably at the operating system level. Such computer program code may be implemented, if needed, in a high-level (e.g., procedural or object-oriented) programming language, or in assembly or machine language if desired; and in any case, the language may be a compiled or interpreted language.

Thus and more generally, parts of the disclosure may be implemented in digital electronic circuitry, while some other parts can be implemented or in computer hardware, firmware, software, or in combinations of them. Generally, processors will receive instructions and data from a read-only memory and/or a random access memory, possibly arranged as evoked earlier in introduction.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims. For example, other materials than those evoked above may be convenient.

What is claimed is:

1. An integrated circuit coupling device comprising:
   an integrated circuit package including one or more integrated circuit layers; and
   an optical data transmission medium connected to the integrated circuit package, and comprising a movable coolant, selected to remove heat from the integrated circuit package, in operation, wherein the integrated circuit coupling device is configured to convert signals between electrical and optical domains, wherein the coolant works as a cladding material or a core material of the optical data transmission medium.

2. The integrated circuit coupling device of claim 1, wherein the coupling device further comprises a power delivery device including an electrical plane, distinct from the optical data transmission medium, and electrically connected to the integrated circuit package.

3. The integrated circuit coupling device of claim 1, wherein the coupling device further comprises a heat transfer device, in thermal communication with both the integrated circuit package and the optical data transmission medium.

4. The integrated circuit coupling device of claim 1, wherein a minimal refractive index contrast between the cladding material and the core material of the optical data transmission medium is larger than 0.01.

5. The integrated circuit coupling device of claim 1, wherein a characteristic dimension of a transverse section of a channel or cavity of the optical data transmission medium receiving the coolant is between 50 and 200 micrometers.

6. The integrated circuit coupling device according to claim 1, wherein a characteristic dimension of a transverse section of a core of the optical data transmission medium is between 20 and 100 micrometers.

7. A computer system, comprising an integrated circuit coupling device according to claim 1.

8. The integrated circuit coupling device according to claim 1, wherein a flow rate of the coolant is chosen according to thermophysical properties of the coolant.

9. An integrated circuit coupling device comprising:
an integrated circuit package including one or more integrated circuit layers; and
an optical data transmission medium connected to the integrated circuit package, and comprising a movable coolant, selected to remove heat from the integrated circuit package, in operation, wherein the integrated circuit coupling device is configured to convert signals between electrical and optical domains, wherein the optical data transmission medium comprises:
a cladding material; and
a core material, wherein the coolant is at least part of the cladding material and a refractive index of the coolant is less than a refractive index of the core material.

10. The integrated circuit coupling device of claim 9, wherein the cladding material further comprises a polymer in contact with the core material, and having a refractive index less than the core material.

11. The integrated circuit coupling device of claim 10, wherein a section of the polymer encloses at least partly a section of the core material and the coolant directly contacts at least a portion of the core material.

12. The integrated circuit coupling device of claim 11, wherein a section of the polymer surrounds a section of the core material and the coolant directly contacts the polymer.

13. An integrated circuit coupling device comprising:
an integrated circuit package including one or more integrated circuit layers; and
an optical data transmission medium connected to the integrated circuit package, and comprising a movable coolant, selected to remove heat from the integrated circuit package, in operation, wherein the integrated circuit coupling device is configured to convert signals between electrical and optical domains, wherein the optical data transmission medium comprises:
a cladding material;
a core material;
a polymer layer in contact with the core material; and
a copper surrounding structure in direct contact with the moveable coolant and the polymer layer, the surrounding structure comprising a material selected to transfer heat.

14. The integrated circuit coupling device of claim 1, wherein the optical data transmission medium comprises:
a cladding material; and
a core material, wherein the coolant is at least part of the core material and a refractive index of the coolant is larger than a refractive index of the cladding material.

15. The integrated circuit coupling device of claim 14, further comprising a coolant fluid circuit including the coolant, and having a circuit section on a same optical path as defined by additional core material, the additional core material having a refractive index close to the refractive index of the coolant.

16. The integrated circuit coupling device of claim 15, further comprising one or mirrors adapted to redirect optical signals to or from the circuits section.

* * * * *